United States Patent [19]

Rushby et al.

[11] Patent Number: 4,835,673
[45] Date of Patent: May 30, 1989

[54] METHOD AND APPARATUS FOR SHARING RESOURCES AMONG MULTIPLE PROCESSING SYSTEMS

[75] Inventors: Robert J. Rushby, Kitchener; John E. Bray, Guelph, both of Canada

[73] Assignee: NCR Corporation, Dayton, Ohio

[21] Appl. No.: 43,064

[22] Filed: Apr. 27, 1987

[51] Int. Cl.[4] .................... G06F 15/16; G06F 3/04; G06F 13/00
[52] U.S. Cl. .................................................... 364/200
[58] Field of Search ... 364/200 MS File, 900 MS File; 340/825.03, 825.05; 370/88, 85

[56] References Cited

U.S. PATENT DOCUMENTS

| | | | |
|---|---|---|---|
| 3,680,056 | 7/1972 | Kropfl | 340/172.5 |
| 4,007,441 | 2/1977 | Faber | 340/147 R |
| 4,038,644 | 7/1977 | Duke et al. | 364/900 |
| 4,434,463 | 2/1984 | Quinquis et al. | 364/200 |
| 4,489,379 | 12/1984 | Lanier et al. | 364/200 |
| 4,621,362 | 11/1986 | Sy | 370/88 |
| 4,625,082 | 11/1986 | Kelly | 370/273 |
| 4,627,052 | 12/1986 | Hoare et al. | 370/88 |
| 4,701,630 | 10/1987 | Annumziata et al. | 307/112 |
| 4,706,080 | 11/1987 | Sincoskie | 340/825.02 |
| 4,707,827 | 11/1987 | Bione et al. | 370/85 |
| 4,733,391 | 3/1988 | Godbold | 370/88 |
| 4,742,511 | 5/1988 | Johnson | 370/94 |
| 4,747,130 | 5/1988 | Ho | 379/269 |
| 4,750,114 | 6/1988 | Hirtle | 364/200 |
| 4,779,092 | 10/1988 | Takao | 340/825.5 |

FOREIGN PATENT DOCUMENTS 0092719 11/1983 European Pat. Off.
0163577 12/1985 European Pat. Off.

OTHER PUBLICATIONS

Elecktronik, vol. 35, No. 5, 3/7/86, Kafka, "G/NET", pp. 120-128.
IEEE Infocom Proc. 85, 26-28 Mar. 1985, "Bridge Design", pp. 178-184, Nishimura et al.
IEEE Software, vol. 2, No. 3, May 1985, "Multicast Comm. on Network Computers", Frank et al., pp. 49-61.

Primary Examiner—Gary V. Harkcom
Assistant Examiner—Christopher H. Lynt
Attorney, Agent, or Firm—Wilbert Hawk, Jr.; Albert L. Sessler, Jr.; Elmer Wargo

[57] ABSTRACT

Multiple processing systems each inclue an administrator processor and a plurality of intelligent resources (like a printer, encoder, for example) which are coupled to the associated administrator processor via a local area network (LAN). Each administrator processor is coupled to two pluralities or sets of intelligent resources with one set being connected through a primary connection node of the associated administrative processor and with the other set being connected to an associated secondary connection node. Each administrator processor is also directly coupled to exactly two other administrator processors through its associated primary and secondary connection nodes to form a closed ring network. An intelligent resource normally assigned to one administrator processor may be assigned (if available) to an adjacent administrator processor to reallocate the workload in the ring network and adjust to certain failures in the system.

22 Claims, 2 Drawing Sheets

PRIOR ART

METHOD AND APPARATUS FOR SHARING RESOURCES AMONG MULTIPLE PROCESSING SYSTEMS

BACKGROUND OF THE INVENTION

This invention relates generally to a method and apparatus for sharing resources among multiple processing systems. For example, each processing system may contain an administrator processor (host processor) and an associated plurality of intelligent resources, like a printer, personal computer, or an encoder, for example, which are serviced by the associated administrator processor via a Local Area Network (LAN). In particular, this invention relates to a method and apparatus for shifting a workload from an intelligent resource (like a printer) of a first one of the processing systems to a corresponding intelligent resource or terminal (like a printer) in a second one of processing systems whenever the intelligent resource of the first processing system becomes overloaded or the associated communications network of the first processing system breaks down, for example.

Figure 1:
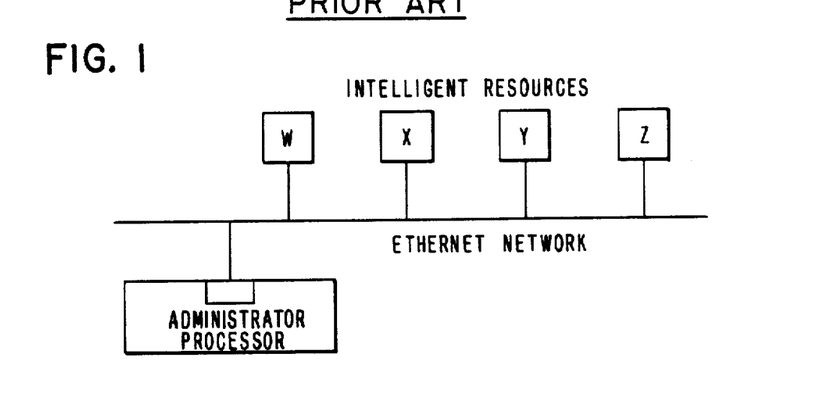
FIG. 1 is a block diagram of a prior-art processing system in which an administrator processor services a plurality of intelligent resources over a local area network.

In certain prior-art data processing systems, like the one shown in FIG. 1, an administrator processor utilizes a plurality of intelligent resources like W, X, Y, and Z coupled to a local area network such as Ethernet, for example, to process a certain workload. For example, one such processing system may be a system for processing documents, like checks, at a financial institution, like a bank. The intelligent resources W, X, Y, and Z shown in FIG. 1 may be as follows:

W may be a magnetic character reader;
X may be a data entry workstation;
Y may be an error correction station; and
Z may be a MICR (magnetic ink) encoder.

Naturally, there may be more than one of these W, X, Y, and Z intelligent resources associated with a particular administrator processor. Also, at a processing center, there may be several such processing systems like the one shown in FIG. 1. While each data processing system may have some redundancy built into it and may have some reserve processing capacity, very often one processing system may become overburdened or elements in the system may become incapacitated while another processing system or elements in another processing system may be idle.

A prior art solution to the problem mentioned in the previous paragraph is to configure all the processing systems on the same LAN; however, the problem with this solution is that the bandwidth of the LAN must be shared among all the processing systems. As the number of processing systems on the LAN increases, the sum of the communication bandwidths for the individual processing systems will exceed the useful available bandwidth on the LAN; consequently, the individual processing systems will experience performance degredation.

SUMMARY OF THE INVENTION

In one aspect, a preferred embodiment of this invention relates to a data communication network having: a plurality of local area networks, with each local area network or LAN having a plurality of intelligent resources coupled thereto; a plurality of administrator processors, with each administrator processor having a primary connection node and a secondary connection node; a first of said LANs with its associated plurality of intelligent resources thereon being coupled to the primary connection node of a first of said plurality of administrator processors and also being coupled to the secondary connection node of an adjacent administrator processor, with the remaining LANs and administrator processors being similarly coupled to form a closed ring network, and with the plurality of intelligent resources on a particular LAN being assigned for normal use to that particular administrator processor whose primary connection node is coupled to that particular LAN; and allocating means for allocating said intelligent resources, when available, among said administrator processors to enable at least a first intelligent resource of a said plurality of intelligent resources which is normally assigned to one administrator processor to be temporarily assigned to that administrator processor which needs said first intelligent resource and whose secondary connection node is coupled to that particular LAN to which a said first intelligent resource is coupled.

In another aspect, a preferred embodiment of this invention relates to a method of allocating intelligent resources in a data communication network having: a plurality of local area networks, with each local area network or LAN having a plurality of intelligent resources coupled thereto, and with each plurality of intelligent resources comprising at least one each of intelligent resources $C_1-C_n$, with $C_1-C_n$ representing different intelligent resources; and a plurality of administrator processors, with each said administrator processor having a primary connection node and a second connection node. The method of allocating said intelligent resources among said plurality of administrator processors includes the steps of: (a) coupling one end of a said LAN with the plurality of intelligent resources thereon to the primary connection node of one said administrator processor and coupling the remaining end of the LAN to the secondary connection node of an adjacent said administrator processor; (b) repeating step a for the remaining administrator processors and LANs with the associated pluralities of intelligent resources thereon to form a closed ring network; (c) assigning the plurality of intelligent resources on a LAN to that one of said administrator processors whose primary connection node is coupled to the LAN; (d) sending a resource request by one of said administrator processors for at least one requested one of said $C_1-C_n$ intelligent resources around said closed ring network; (e) determining whether or not said requested one of said $C_1-C_n$ intelligent resources is available; and (f) assigning said requested one, when available, from the plurality of intelligent resources which is located on the LAN which is connected to the secondary connection node of the administrator processor sending said resource request.

In the preferred embodiment of this invention each administrator processor is directly connected to two pluralities or sets of intelligent resources, with one set being connected through a primary connection node of the associated administrator processor and with the other set being connected through an associated secondary connection node. Each administrator processor is also directly coupled to exactly two other administrator processors through its associated primary and secondary connection nodes.

An advantage of the present invention is that in a normal processing situation, each administrator processor utilizes only those intelligent resources coupled to it via its primary connection node; this means that the full bandwidth of its associated LAN is available to it. During an intelligent resource overload or failure, for example, reallocation of intelligent resources is accomplished by enabling an administrator processor which needs the intelligent resource to pick up the intelligent resource from the plurality of intelligent resources on the LAN coupled to its secondary connection node. This process is repeated, if necessary, around the closed ring network until any slack in excess intelligent resource capacity is taken up.

This advantage and others will become more readily understood in connection with the following description, claims and drawing.

DETAILED DESCRIPTION OF THE INVENTION

Figure 2:
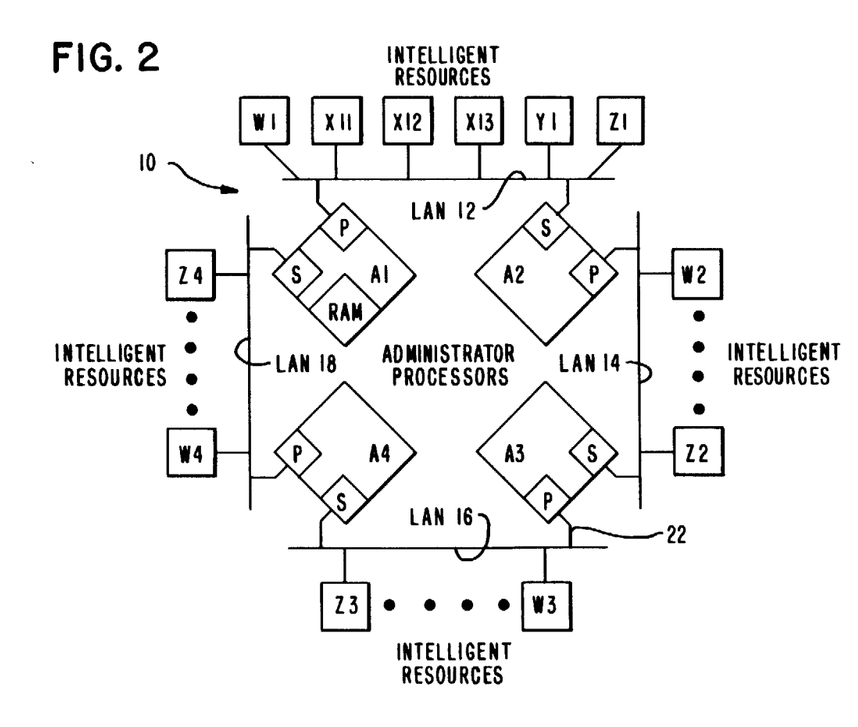
FIG. 2 is a schematic, block diagram of a communication network made according to a preferred embodiment of this invention, showing a plurality of administrator processors coupled to a plurality of intelligent resources.

The architecture of a communication network 10 made according to a preferred embodiment of this invention is shown in FIG. 2. Notice that the network 10 is comprised generally of a plurality of processing systems similar to the one shown in FIG. 1. In this regard, each processing system is comprised of a administrator processor, like A1, which is coupled to its intelligent resources, like W1, X11, X12, X13, Y1 and Z1 via a Local Area Network (LAN) 12, like Ethernet, for example. Similarly, administrator processor A2 is coupled to its intelligent resources W2 through Z2 over LAN 14; the administrator processor A3 is coupled to its intelligent resources W3 through Z3 over LAN 16; and finally, the administrator processor A4 is coupled to its intelligent resources W4 Z4 over LAN 18. The term "administrator processor" means that an administrator processor, like A1 for example, acts as a host processor for its terminals or intelligent resources which it services. The term "intelligent resource" means that the terminal is assigned to a host processor or an administrator processor along with several other intelligent resources. The intelligent resources may also have internal processors to control their functioning.

Continuing with a description of the architecture of the network shown in FIG. 2, each administrator processor, like A1 for example, has a primary connection node (P) and a secondary connection node (S). The primary connection node (P) couples the administrator processor A1 with its primary group or plurality of intelligent resources W1 through Z1 over the associated LAN 12. The secondary connection node (S) of an administrator processor is used to couple that administrator processor to an alternate or secondary group of intelligent resources. For example, in the embodiment described, the administrator processor A2 acts as a secondary administrator processor for the plurality of intelligent resources W1 through Z1 via its associated secondary connection node (S) and the LAN 12. Notice that the administrator processor A2 is coupled to its primary plurality of intelligent resources W2 through Z2 via LAN 14. In other words, each administrator processor has a primary, plurality of intelligent resources which it services through its primary connection node (P) and the LAN connected to the node (P), and each administrator processor also has a secondary plurality of intelligent resources which it may service through its secondary connection node (S) and the LAN connected to the node (S). Looking at this same situation from the perspective of the plurality of intelligent resources, each plurality of intelligent resources is serviced, normally, by its primary administrator processor via its associated primary connection node (P), or in situations to be described later herein, each plurality of intelligent resources is serviced by its secondary administrator processor via its associated secondary connection node (S). Similarly, the plurality of intelligent resources W3 through Z3 is serviced by primary administrator processor A3, and the plurality of intelligent resources W4 through Z4 is serviced by primary administrator processor A4.

When the administrator processors A1 through A4 are coupled as described and shown in FIG. 2, the resulting network 10 is referred to as a "closed ring" communication network. The primary and secondary connection nodes (P) and (S), respectively are Ethernet type nodes in the embodiment described; more details about these nodes will be given hereinafter.

A typical application for the network 10 described in relation to FIG. 2 may relate to a financial environment in which the processing of financial documents, like checks, takes place. The particular installation may include a plurality of processing systems like that shown in FIG. 1 as earlier discussed herein. The plurality of intelligent resources, like W1 through Z1, may include a data entry terminal, an encoder, sorter, proofing machine, and printer, for example. The data entry terminal mentioned might be intelligent resource W1, W2, W3, or W4 in each of the pluralities of intelligent resources mentioned with regard to network 10. Similarly, the sorter might be intelligent resource Y1, Y2, Y3 or Y4 in each of the groups of intelligent resources. Notice that each intelligent resource of a particular type has a corresponding designation, address, or location within its associated group of intelligent resources. This is a feature which facilitates the transfer of data as will be described hereinafter.

In this regard, a primary object of this invention is to provide a robust service in instances where the equipment used fails in part or is overloaded locally. The transference of data from an intelligent resource of one processing group to the intelligent resource of another processing group is done on the basis of a similar, intelligent resource. In other words, if a data entry terminal or intelligent resource W2 (associated with administrator processor A2) breaks down, the network 10 (FIG. 2) would attempt to shift the work assigned to intelligent resource W2 to intelligent resource W1 associated with the administrator processor A1. Some examples will illustrate how this shifting or allocating of work is effected when failures occur.

There are three basic failures in the network 10 which cause data processing work to be shifted around the network 10. These failures are conveniently called: Failure, Type 1; Failure, Type 2; and Failure, Type 3.

Failure, Type 1 is a failure of the network connection associated with the primary connection node (P) of an administrator processor.

Failure, Type 2 is a failure of an administrator processor.

Failure, Type 3 is a failure of a unique intelligent resource on the LAN.

A Type 1 failure is detected in one of two ways, namely, by an administrator processor, like A3, or by an intelligent resource, like W3 through Z3. Assume that the failure occurs between the primary connection node (P) of the administrator processor A3 and its associated LAN 16 at area 22 in FIG. 2. Assume also that it is the administrator processor A3 which detects the failure. In this regard, the administrator processor A3 sends a message to administrator processor A2 to this effect over the secondary connection node (S) of administrator processor A3 and LAN 14. Assume a situation in which the work loads can be conveniently shifted around the network 10 among the administrator processors as will be described hereinafter. In this case, the adminstrator processor A3 takes over the processing work of the intelligent resources W2 through Z2. The administrator processor A2 takes over the processing work of intelligent resources W1 through Z1. The administrator processor A1 takes over the processing work of the intelligent resources W4 through Z4 and the administrator processor A4 takes over, via its secondary connection node (S) and LAN 16, the processing work for intelligent resources W3 through Z3. After some "overhead" or loss in time of transferring processing work among the administrator processors A1-A4, the network 10 continues to process the work with undegraded throughput. The overhead mentioned is handled by software which advises the intelligent resources that they are now being served by a different administrator processor (due to the shifting) and that they are to send messages to a different administrator processor.

Normally, an administrator processor, like A3 in the example just described, would detect a failure on its primary LAN 16 before one of its associated intelligent resources on this LAN 16. This is because administrator processor A3 has a heavier level of communication than its associated intelligent resources W3 through Z3. The means for detecting a failure of a primary LAN or its nodes may be conventional software which is located in the RAM of the associated administrator processor A1-A4. The intelligent resources like W1-Z1, for example, also may have conventional software for detecting when their associated administrator processors, like A1, fails; the software may be located in a RAM associated with the intelligent resources, W1-Z1, for example.

As earlier stated herein, a Type 1 failure can also be detected by an intelligent resource instead of an administrator processor. When a failure is detected by an intelligent resource, like W3 through Z3, it has no way of knowing whether its associated administrator processor A3 or the associated LAN 16 is "down". In the earlier example given, the administrator processor A3 would send messages to different intelligent resources on its primary LAN 16, and if none of the intelligent resources W3 through Z3 responded, the administrator processor A3 could assume that the LAN 16 was down or inoperative. An intelligent resource like W3 through Z3 would send a notification or message to its secondary administrator processor A4 that a failure of the LAN 16 has occurred. The message sent to administrator processor A4 would include an address for administrator processor A3; the actual message format will be discussed later herein. Upon receiving the message discussed, the administrator processor A4, "opens" or reviews the message and decides that it is a message which should be forwarded around the network 10. This message is sent clockwise (as viewed in FIG. 2) around the network 10 until it is received by the administrator processor A3 which recognizes the address as its own. Administrator processor A3 will then take corrective action if it has not already discovered the problem.

As previously stated, a Type 2 failure is a failure of an administrator processor A1 through A4 (FIG. 2). In this regard, assume that administrator processor A3 fails. When this happens, one of its associated terminals W3 through Z3 will have to decide whether or not administrator processor A3 has failed. This is accomplished by having an intelligent resource W3 through Z3 attempt notification by sending a notification message to administrator processor A4 which is then routed to administrator processors A1 and A2 and then to administrator processor A3. If administrator processor A3 does not respond to the notification message from its associated intelligent resource after a predetermined amount of time for a time out, the intelligent resource on LAN 16 will notify its secondary administrator processor A4 that administrator processor A3 is inoperative. In this circumstance, administrator processor A4 will take over the processing work of intelligent resources W3 through Z3 on a degraded throughput basis and attempt to transfer some of its processing work to the administrator processor A1. This apportionment of work among the remaining active administrative processors A4, A1, and A3 is done on the basis of availability of service capacity. In general, the system 10 is designed to have some reserve processing capacity to handle such a situation.

As previously stated, a Type 3 failure is a failure of one of the intelligent resources, like W3 (FIG. 2). Assume that intelligent resource W3 is the only one of its kind in the group of intelligent resources W3 through Z3. The administrator processor A3 will detect that intelligent resource W3 has failed, and administrator processor A3 will send a request to administrator processor A2 for some processing time on the intelligent resource W2 associated with administrator processor A2. Notice that the request is made for a corresponding terminal, i.e., intelligent resource W2 is like intelligent resource W3 which failed. Administrator processor A2 will then request some processing capacity from administrator processor A1 which will, in turn, request some processing capacity from administrator processor A4, which will, in turn, request some processing capacity from administrator processor A3. Administrator processor A3 will respond by indicating to administrator processor A4 that its intelligent resource W3 failed. Administrator processor A4 will then respond by allocating a portion of the processing capacity of intelligent resource W4 to the administrator processor A1 associated with the intelligent resource W1. Similarly, administrator processor A1 will allocate a portion of the processing capacity of intelligent resource W1 to administrator processor A2 which allocates some of the processing time of intelligent resource W2 to administrator processor A3.

Alternatively, if any intelligent resource W4, W1, or W2 has sufficient spare capacity to handle the load for intelligent resource W3 in the example described, the request will be granted at that point instead of transferring the request around the network 10. In situations like this, the request message has a field designated for the originator of the request, otherwise such a message would circulate endlessly.

A feature of this process is that by requesting spare processing capacity for a particular intelligent resource, like W3 around the network 10 (formed into a ring), and by accumulating extra capacity on the corresponding intelligent resource of the nearest secondary administrator processor, the processing traffic is kept local. If one were to attempt to transfer the processing work directly from intelligent resource W3 of administrator processor A3 to the corresponding intelligent resource W4 associated with administrator processor A4, a lot of overhead time would be taken just to get intelligent resource W4 to absorb the displaced load. With the process being described in this embodiment, the processing work to be completed by the intelligent resource W2 associated with administrator processor A2, for example, can be completed by intelligent resource W4 as well as intelligent resource W1. Once the re-allocation of resources in the network 10 is made as described, there is no additional traffic over the network 10 over what would have been on the network anyhow.

It is quite possible that all of the intelligent resources associated with the administrator processors A1-A4 (FIG. 2) are fully loaded with work. If administrator processor A3 is requesting the extra processing capacity (in the example being discussed) when none is available, administrator processor A3 would have to wait until there is spare capacity somewhere in the network 10. As stated earlier herein, the network 10 should be configured so that there is some spare processing capacity in it so that large data files or processing jobs do not have to be shifted halfway around the network 10.

While the recent description proceeded with regard to Type 1, Type 2 and Type 3 failures, there are also Overload Modes 1, 2 and 3 which correspond to the Type 1, 2 and 3 failures. The Overload Modes 1, 2 and 3 are not failures; they just represent overloading in the network 10. For example, an Overload Mode 1 represents the inability of a LAN, like LAN 16, to keep up with its local traffic. The administrator processor, like A3 for example, can sense such an overload situation and would attempt to relieve it by attempting to transfer some of the processing work to the administrator processor A2.

A feature of trying to pass overload work from an intelligent resource like W3 of administrator processor A3 to a corresponding intelligent resource W2 of an adjacent administrator processor A2, is that very often physical paper is associated with the processing transactions being performed by network 10. For example, if the intelligent resource W3 is an endorsing terminal used in the processing of checks and deposit slips by financial institutions, it may mean that the physical checks associated with the processing by intelligent resource W3 may have to be physically moved to the intelligent resource W2 in the example described. Under these conditions, it is best to keep the distance that the documents have to be physically moved to a minimum.

Another feature of this invention is that the network 10 can be expanded with a minimum of changes. For example, if one were to add an additional administrator processor, like A5 (not shown) between the administrator processors A1 and A4, new addresses would not need to be added to all the administrator processors in the network 10. Because communication in the network 10 actually takes place between "neighbors", only the address tables (to be later described) of the administrator processors A4 and A1 would have to be changed. The address table of administrator processor A1 would be changed to include newly-added administrator processor A5 (not shown) as its secondary administrator processor instead of administrator processor A4. Similarly, the address table of administrator processor A5 would include administrator processor A4 as its secondary administrator processor.

Another feature is that the size of the address tables associated with administrator processors A1 through A5 would not have to increase. This is because each administrator processor A1 through A5 communicates only with the administrator processor on its left or right within the network 10. Each one of the primary (P) and secondary (S) connection nodes associated with each of the administrator processors A1 through A5 in the network 10 has its own address which is unique to the world. This aspect will be discussed later herein during a discussion of the data format used with the network 10.

The procedure by which an administrator processor, like A1 of one processing system, obtains processing resources from the intelligent resources like W4–Z4, for example, of another processing system is referred to as the Resource Request (RR) procedure, which is part of the means for allocating intelligent resources among the various administrator processors A1-A4. The RR procedure is stored in the RAMs of the associated administrator processors. The RR procedure is initiated or invoked when a particular administrator processor determines that it is short of intelligent resources (like W1, for example) due to overloading or equipment failure, as discussed earlier herein. When this occurs, the administrator processor sends out an Resource Request (RR) message to the administrator processor which is located on the particular LAN connected to its secondary node(S). In the example being discussed, if administrator processor A1 needs additional resources, it sends out an RR message through its secondary node S to the administrator processor A4 via the LAN 18. The RR message contains a code identifying it as a resource request, and it also contains a table of required resources with "blanks" to be filled in by the "secondary" administrator processor, like A4, for example. Naturally, the format of the RR message conforms to the format of the particular LAN being used.

As an example of an RR message, suppose the administrator processor A1 requests two units of an X-type intelligent resource and one unit of a Y-type intelligent resource. The RR message would have the following format:

(Message #1)　/////　[A4P][A1S][resrq X X Y]　\\\\\\\\\\\\\\ .

With regard to the above message, the lines //// indicate a normal network message "header" or "preamble" and the "A4P" indicates the destination to administrator processor A4 via the primary node P. The "A1S" indicates the source of the message as coming from administrator processor A1 via the secondary node S. The term "resrq" indicates the RR message, and it is followed by the types of intelligent resources requested; in this case, it is resources X, X and Y, which are requested. Spaces are left between the X, X and Y intelligent resource designations to enable the spaces to be filled in by a "secondary" administrator processor. A secondary administrator processor is that one which provides the requested resources from its associated intelligent resources when a request or RR message is initiated by another administrator processor. The lines  in the Message #1 indicate a normal network message "trailer" or epilog.

It is possible that an RR message may not be satisfied by one secondary administrator processor. For example, suppose in the example given in the previous paragraph that the administrator processor A4 were able to supply only one unit of an X intelligent resource and one unit of a Y intelligent resource on its primary LAN 18 from its intelligent resources W4 through Z4. In this regard, the administrator processor A4 would take the Message #1 cited earlier herein, assign the intelligent resources which it can relinquish, and create a message which is forwarded to the next administrator processor A3 which will be quizzed for the availability of the remaining requested intelligent resources. The message from administrator processor A4 to administrator processor A3 would have the following format:

(Message #2) ///// [A3P][A1S][resrq XA4P X YA4P]  .

With regard to Message #2, notice that the destination is to administrator processor A3 via its primary node P and that one X intelligent resource (XA4P) and one Y intelligent resource (YA4P) will be relinquished by administrator processor A4. Because the request for a second X intelligent resource has not been filled by administrator processor A4, the space is left blank in Message #2.

Continuing with the example being discussed, if administrator processor A3 is able to relinquish an X intelligent resource to administrator processor A1, the administrator processor A3 would then de-assign the X intelligent resource from its address table (to be later described herein) and send the following message back to administrator processor A4:

(Message #3) ///// [A4P][A1S][grant XA4P XA3P YA4P]  .

Notice in Message #3 that administrator processor A3 sends the message to administrator processor A4 (and not administrator processor A1 directly) indicating that the X intelligent resources are being filled by administrator processors A4 and A3.

Upon receiving Message #3, administrator processor A4 takes the following actions. Because administrator processor A3 is going to relinquish one unit of an X intelligent resource, it means that administrator processor A4 can relinquish both of its X intelligent resources. This means that the work which was normally handled by the X intelligent resource (X4) associated with administrator processor A4 will now be handled by the X intelligent resource (X3) associated with the administrator processor A3. Administrator processor A4 would effect a "graceful" transfer of the workload from its X intelligent resource (X4) to the X intelligent resource (X3) associated with administrator processor A3. The term "graceful" is used to indicate an orderly transference of the workload. For example, the X intelligent resource might be an encoder in a financial or banking environment; generally, documents, like checks, are processed in batches of 200–300 checks per batch while using an encoder. In the example being described, administrator processor A4 would wait to complete the batch of processing before transferring the workload to the X intelligent resource associated with administrator processor A3. After this is done, the administrator processor A4 de-assigns two X intelligent resources and one Y intelligent resource from its primary address table, notifies the units, and sends the following message to administrator processor A1:

(Message #4) ///// [A1S][A1S]]grant XA4P XA4P YA4P]  .

Upon receiving this message, administrator processor A1 can resume its processing activity by picking up two units of X intelligent resources (X4) and one unit of a Y intelligent resource (Y4).

If it occurs, in the example being discussed, that the X and Y intelligent resources requested by the administrator processor A1 were not available after the request had gone around the network 10 to all the administrator processors, then the administrator processor A1 which originated the request might have to modify its request. For example, the "originating" administrator processor may modify its request to match the availability of the intelligent resources associated with the other administrator processors. The request is modified by sending out a new message with a request for the known available resources. Alternately, the originating administrator may simply wait until it receives an "excess resources" message from the other administrator processors. If the administrator processor requesting an intelligent resource finds that none is available and that that particular resource is critical to further processing by the administrator processor, then the administrator processor suspends processing. Thereafter, this administrator processor can send out a message indicating that its remaining intelligent resources are excess capacity, enabling other administrator processors in the system 10 to utilize them if needed.

When an administrator processor finds that it has excess intelligent resources like W1–Z1 due to underloading or a failure of a critical resource as described in the previous paragraph, the following procedure is used. If administrator processor A1 has one X intelligent resource and two Y intelligent resources available, it sends a message to this effect to the administrator processor which is located on its primary LAN. Looking at FIG. 2, administrator processor A1 sends the message over LAN 12 to administrator processor A2. The message would have the following format:

(Message #5) ///// [A2S][A1P][exres X Y Y]  .

The format of Message #5 is the same as that discussed earlier herein, with the new term "exres" standing for excess resources. The excess intelligent resource procedure being discussed is also part of the means for allocating resources among the various administrator processors A1–A4. This procedure is effected by software located in the RAMs of the associated administrator processors A1–A4. If administrator processor A2 does not need some or all of the intelligent resources classified as excess, then it reframes the message making the destination "A3S" and keeping the source as "A1P". It then sends the message to the administrator processor A3 (via the secondary node S). If none of the administrator processors A2, A3 or A4 requires any of the excess intelligent resources offered, the administrator processor initiating the excess request (A1 in the example being described) simply "swallows" or terminates the message after it traverses the network 10 of administrative processors A2, A3 and A4. Thereafter, the administrator processor A1 simply waits until a resource request, if any, is initiated for the excess resources.

Having described the Resource Request (RR) procedure and the excess resource procedure, it is useful to describe, in more detail, the allocating means by which these procedures are effected. In this regard, each administrator processor A1-A4 has a network address table, message forwarding logic, and associated software which may be stored in a RAM, for example, in the associated administrator processor. A RAM is shown only for administrator processor A1 to simplify the showing of FIG. 2. The network address table for each administrator processor is shown in the following Table #1.

TABLE #1

NETWORK ADDRESS TABLE FOR ADMINISTRATOR PROCESSORS A1-A4

| Col. #1 | Col. #2 | Col. #3 | Col. #4 | Col. #5 | Col. #6 |
|---|---|---|---|---|---|
| 1 | Me | P | 101010 | * | * |
| 2 | A | P | 111111 | * | * |
| 3 | W | P | 121212 | Y | Y |
| 4 | X | P | 131313 | Y | Y |
| 5 | X | P | 141414 | Y | Y |
| 6 | X | P | 151515 | Y | Y |
| 7 | Y | P | 161616 | Y | Y |
| 8 | Z | P | 171717 | Y | Y |
| 9 | Z | P | 181818 | Y | Y |
| 10 | Me | S | 191919 | * | * |
| 11 | A | S | 202020 | * | * |
| 12 | W | S | 212121 | N | N |
| 13 | X | S | 222222 | N | N |
| 14 | X | S | 232323 | N | N |
| 15 | X | S | 242424 | N | N |
| 16 | Y | S | 252525 | N | N |
| 17 | Z | S | 262626 | N | N |

Notations for Table #1 are as follows:

Column #1 represents "shorthand" addresses for the administrator processors and intelligent resources (W, X, Y and Z) which are visible to the particular administrator processor associated with a Table #1;

Columns #2 represents the kinds of intelligent resources and the designations for the administrator processors which are "visible" to the particular administrator processor associated with a Table #1;

Column #3 indicates whether the visible administrator processors and intelligent resources are on the primary (P) or secondary (S) node of the associated administrator processor;

Column #4 indicates full arbitrary addresses corresponding to the shorthand addresses in Column #1;

Column #5 indicates by a Yes (Y) or No (N) whether or not the particular intelligent resource in Column #2 is assigned by the administrator processor associated with a Table #1; and Column #6 indicates by a Yes (Y) or No (N) whether or not a particular intelligent resource assigned to a particular administrator terminal is in fact being used.

Figure 3:
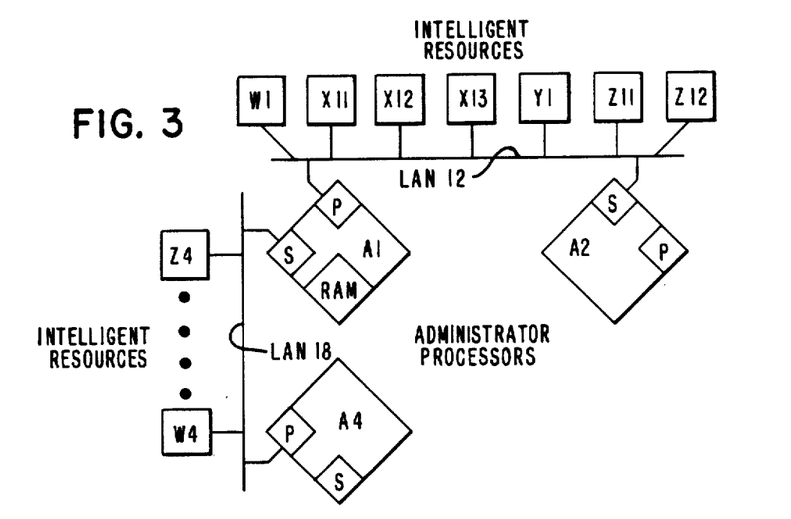
FIG. 3 is a schematic, block diagram of a portion of FIG. 2 to show certain features of this invention.

Some additional clarification of Table #1 is necessary before discussing how it is used. In this regard, Column #2 of address 1 (under Column #1) has a "Me" designation therein; this designation represents the particular administrator processor associated with Table #1. As previously stated, there is one such Table #1 associated with each administrator processor A1-A4. The term "visible" as used in the notations associated with Table #1 refers to those administrator processors and intelligent resources which are directly connected to an administrator processor via its primary and secondary nodes P and S. For example, FIG. 3 shows a portion of FIG. 1 which is used to illustrate the administrator processors (like A4 and A2) which are "visible" to administrator processor A1. Notice that the intelligent resources W1-Z12 and W4-Z4 are also visible to administrator processor A1. In a sense, FIG. 3 represents "all the world" which is seen by administrator processor A1. Notice also from FIG. 3 that each group of intelligent resources like W1-Z12 can address two different administrator processors; this group (W1-Z12) may address administrator processor A1 by its primary node P and may also address administrator processor A2 by its secondary node S. And finally, the asterisks (*) appearing in Columns #5 and #6 of Table #1 at addresses 1 and 2 (Column #1) are used to indicate that the Columns #5 and #6 are not applicable for administrator processors. In other words, an administrator processor cannot assign itself to another administrator processor. The same situation exists for the administrator processors associated with the addresses 10 and 11 of Table #1.

As an example of how to use Table #1, assume that Table #1 is associated with administrator processor A1. To simplify the explanation, the addresses in Column #1 will also be referred to as "lines", so as to locate a row of data more readily. The "Me" designation on line 1 under Column #2 indicates that this is the administrator processor A1 in the example described. On line 2, the "A" under Column #2 refers to the administrator processor A2 which is located on the primary node P of administrator processor A1, with the complete address of administrator processor A2 (via its primary node P) being shown under Column #4 as 111111. The addresses under Column #4 are simply arbitrary addresses.

Line 3 of Table #1 contains data about intelligent resource W, with the designation being shown under Column #2 as "W"; this corresponds to the intelligent resource W1 shown in FIG. 3 which is connected to administrator processor A1 via its primary node P (Column #3). The Y for "Yes" in Column #5 indicates that the intelligent resource is assigned (Y) to administrator processor A1. From the example of Table #1, the intelligent resource W (line 3) is being used by the administrator processor A1; consequently, the entry under Column #6 indicates a "Y" for a yes. If administrator processor A1 were not using the intelligent resource W, an "N" for "No" would appear under Column #6; this would mean that intelligence resource W (on line 3) would be available as an "excess resource" as discussed earlier herein.

Lines 4, 5 and 6 of Table #1 contain data about the three intelligent resources X11, X12 and X13 associated with the administrator processor A1 via its primary node P; these resources are also shown in FIG. 3. Similarly, lines 7, 8 and 9 contain data about intelligent resources Y and Z. Notice that there are two Z resources in Table #1; these correspond to resources Z11 and Z12 shown in FIG. 3.

Lines 10-17 of Table #1 contain data about the intelligent resources W, X, Y and Z which are associated the administrator processor A1 via its secondary node S in the example being described. These resources W, X, Y and Z, on lines 10-17, correspond to the intelligent resources designated as W4-Z4 in FIG. 3. Notice that the address for administrator processor A1, via its secondary node S, is 191919 (from Column #4) as contrasted with address 101010 via its primary node P. In the example being described, none of the intelligent resources W-Z, on lines 12-17 of Table #1, is currently assigned to administrator processor A1; consequently, these lines 12-17 contain an "N" under Column #5. Because administrator processor A1 is not using the intelligent resources W-Z on lines 12-17, an "N" also appears under Column #6 for these lines. The administrator processor A (Column #2), which appears on line 11 is A4; it has an address of 202020 (Column #4) and is coupled to the secondary node S (Column #3) of administrator processor A1 in the example described. To repeat, there is one such table, like Table #1, for each administrator processor A1-A4 in the network 10.

In addition to the network address table (Table #1) just described, the means by which the Resource Request procedure and the Excess Resource procedures are effected also include message forwarding logic as alluded to earlier herein and as shown in the following Table #2.

TABLE 2
ADMINISTRATOR PROCESSOR MESSAGE FORWARDING LOGIC

A If message is received through the primary node
 1. If (DEST=Me(P)) or (DEST=Me(S)), This message is for Me; send data from message to application.
 2. Else, forward message to administrator processor through the secondary node S.
 3. End if. Else:
B. If message is received through secondary node S -
 1. If (DEST=Me(P)) or (DEST=Me(S)), This message is for Me; send data from message to application.
 2. Else, forward message to administrator processor through the primary node P.
 3. End if. End if.

As previously stated, a message can be received by an administrator processor (A1-A4) on either its primary or secondary nodes P or S, respectively. Portion A of Table #2 represents the situation in which the message is received through the primary node P associated with an administrator processor. If the address is for "Me", i.e., the intended or addressed administrator processor, it absorbs the message by sending it to an application, for example. Notice that an administrator processor A1-A4 can recognize addresses related to its primary node P or secondary node S; each administrator processor has software associated with it to recognize its own addresses. If a message is not for the administrator processor in question, it forwards the message (via its secondary node S) to the next administrator processor.

Correspondingly, if a message is received by an administrator processor through its secondary node S, as recited in portion B of Table #2, it recognizes the message as one directed to it, or the message is routed by the administrator processor via its primary node P to the next adjacent administrator processor in the system 10.

Each of the intelligent resources (W-Z) associated with each of the administrator processors A1-A4 has a network address table as shown in the following Table #3.

TABLE #3
NETWORK ADDRESS TABLE FOR INTELLIGENT RESOURCE ON A PRIMARY LAN

|  | Address | Assigned? |
|---|---|---|
| Primary | 101010 | Y |
| Secondary | 111111 | N |

Assume that Table #3 is a table for intelligent resource W1 (FIG. 2) which is associated with administrator processor A1 via primary node P and LAN 12, and this resource is also associated with administrator processor A2 via its secondary node S. Earlier herein, it was assumed that the data in Table #1 was associated with administrator processor A1. Following these assumptions, the intelligent resource W1 would utilize the address 101010 for the administrator processor A1 to which it is assigned; see the address under Column #4 in Table #1 on line 1 thereof. If the administrator processor A1 were to turn over processing to the administrator processor A2, the intelligent resource W1 would then look to the secondary address 111111 for its processing. The address 111111, in the example being described, is found under Column #4 on line 2 of Table #3. As far as the "Assigned?" column of Table #3 is concerned, an intelligent resource like W1 looks to the administrator processor (like A1) connected to the associated LAN (like 12) via its primary node (P) as the "Primary" listed in Table #3 and looks to the administrator processor (like A2) connected to the same LAN (like 12) via the secondary node (S) (of A2) as the "Secondary" listed in Table 3. There is software associated with each of the administrator processors A1-A4 to inform its associated intelligent resources W-2 when a switch in administrator processors is made. When the switch is made, the "Y" (Yes) and "N" (No) designation under the "Assigned?" column of Table #3 are reversed.

Having described the Request Resource (RR) procedure, the Excess Resource procedure, and the means for transferring messages and data around the system 10, it is useful to discuss how the procedures or tools discussed herein can be used to handle the Failures, Type 1, Type 2 and Type 3 discussed earlier herein.

A Failure, Type 1 is a failure which occurs at the primary node (P) of an administrator processor (like A1). Suppose intelligent resource W1 (FIG. 2) finds that it is unable to communicate with its associated administrator processor A1. From Table #3, intelligent resource W1 knows that its secondary administrator processor is A2; consequently, intelligent resource W1 will send a message to administrator processor A2, informing A2 that it is not able to communicate with administrator processor A1. Administrator processor A2 will attempt to communicate with administrator processor A1, and if processor A1 does not respond, processor A2 will send a message to processor A1 via administrator processors A3 and A4. When administrator processor A1 receives the message, it will invoke or initiate an RR procedure for a full set of resources. The request will propagate around the network 10 until it reaches administrator processor A2. Administrator processor A2 will then pick up the intelligent resources W1-Z1 on LAN 12 for its processing, and then it will make intelligent resources W2-Z2 available via the excess resource procedure. Administrator processor A3 will pick up the intelligent resources W2-Z2, and it will make its intelligent resources W3-Z3 available to administrator processor A4. Correspondingly, administrator processor A4 will make its intelligent resources W4-Z4 available to administrator processor A1. Thereafter, administrator processor A1 will pick up intelligent resources W4-Z4 and resume processing even though a failure had occurred at its primary node P.

A Failure, Type 2 is a failure of an administrator processor A1-A4 itself. Assume administrator processor A1 fails. In this situation, one of the intelligent resources W1-Z1 sends a message to administrator processor A2 as was the case with a Failure, Type 1. If administrator processor A1 does not respond to the message from administrator processor A2 within a timeout period, then administrator processor A2 assumes that administrator processor A1 is "down". Thereafter, administrator processor A2 makes the intelligent resources W1-Z1 associated with administrator A1 available as "excess" resources to be used, if needed, by the rest of the network 10, as previously described.

A Failure, Type 3 is a failure of an intelligent resource, like W1-Z1. If W1 were to fail, for example, administrator processor A1 would then have to send out a RR request for that resource, as previously described.

A feature of this invention, as previously stated, is that the full bandwidth of each LAN is available to that administrator processor which is normally assigned to that LAN or coupled thereto via its associated primary connection node P. When there is an overload relative to one or more intelligent resources on a particular LAN, the administrator processor associated with that LAN (requesting administrator processor, like A1) picks up one or more resources when available, from the plurality of resources associated with the adjacent administrator like A4, which may be considered the first supplying administrator processor. In this way, the extra processing which was needed relative to LAN 12 is shifted to LAN 18 in the example being discussed, without exceeding the bandwidth traffic on either LAN 12 or LAN 18. While both administrator processors A1 and A4 would be operating on LAN 18, the protocol associated with the particular LAN being used would handle any contention problems between these administrator processors.

Each of the intelligent resources W1-Z1, W2-Z2, W3-Z3, and W4-Z4 has its own microprocessor and associated software for performing the operations indicated. Each administrator processor A1-A4 may also have a keyboard and display (not shown) to provide for the usual operator interaction.

What is claimed is:

1. A data communication network comprising:
   a plurality of local area networks, with each local area network (LAN) having a plurality of intelligent resources coupled thereto;
   a plurality of administrator processors, with each administrator processor having a primary connection node and a secondary connection node;
   a first of said LANs with its associated plurality of intelligent resources thereon being coupled to the primary connection node of a first of said plurality of administrator processors and also being coupled to the secondary connection node of an adjacent administrator processor, with the remaining LANs and administrator processors being similarly coupled to form a closed ring network, and with the plurality of intelligent resources on a particular LAN being assigned for normal use to that particular administrator processor whose primary connection node is coupled to that particular LAN; and
   allocating means for allocating said intelligent resources, when available, among said administrator processors to enable at least a first intelligent resource of a said plurality of intelligent resources which is normally assigned to one administrator processor to be temporarily assigned to that administrator processor which needs said first intelligent resource and whose secondary connection node is coupled to that particular LAN to which said first intelligent resource is coupled.

2. The network as claimed in claim 1 in which said allocating means comprises:
   request means for sending a resource request message around said closed ring network to enable each said administrator processor to indicate whether or not it has a requested intelligent resource available for use by an administrator processor requesting the requested intelligent resource.

3. The network as claimed in claim 2 in which said allocating means also comprises:
   excess means for sending an excess resource message around said closed ring network by an administrator processor having excess intelligent resources to enable the remaining administrator processors to gain access to said excess intelligent resources, if needed.

4. The network as claimed in claim 3 in which said allocating means also comprises:
   means for detecting a failure in said primary connection nodes, said administrator processors, and said intelligent resources.

5. The network as claimed in claim 4 in which said allocating means includes a network address table for each said administrator processor, with each said network address table having the addresses of the administrator processor and the intelligent resources coupled to its primary connection node, and also having the addresses of the administrator processor and the intelligent resources coupled to its secondary node.

6. The network as claimed in claim 5 in which each said network address table also has means for indicating whether or not the particular intelligent resources coupled to the primary and secondary connection nodes of the associated administrator processor are normally assigned to it and in which each said network address table also has means for indicating whether or not the administrator processor associated with the network address table is in fact using the intelligent resources on said network address table.

7. The network as claimed in claim 6 in which said allocating means also comprises a network address table for each intelligent resource for indicating the addresses of the administrator processors to which the intelligent resource is coupled via its associated LAN and also for indicating that particular administrator processor to which it is assigned.

8. The network as claimed in claim 7 in which each said plurality of intelligent resources comprises at least one each of a data entry terminal, an encoder, a sorter, a proofing machine, and a printer which are associated with a financial processing system.

9. A data communication network comprising:
   a plurality of local area networks, with each local area network (LAN) having a plurality of intelligent resources thereon, and with each said plurality of intelligent resources comprising at least one each of intelligent resources $C1-C_n$, with $C1-C_n$ representing different intelligent resources;

a plurality of administrator processors, with each administrator processor having a primary connection node and a secondary connection node;

a first of said LANs with its associated plurality of intelligent resources thereon being coupled to the primary connection node of a first of said plurality of administrator processors and also being coupled to the secondary connection node of an adjacent administrator processor, with the remaining LANs and administrator processors being similarly coupled to form a closed ring network, and with the plurality of intelligent resources on a particular LAN being assigned for normal use to that particular administrator processor whose primary connection node is coupled to that particular LAN;

each said administrator processor having means for initiating a resource request for at least one requested one of said $C1-C_n$ intelligent resources ad for sending the resource request around said closed ring network; and each administrator processor having means to determine its workload and to indicate whether or not it can fill said resource request;

each said administrator processor, when filling a resource request, doing so from those intelligent resources coupled to its associated primary connection node to enable the administrator processor initiating the resource request to utilize the requested intelligent resource via the secondary connection node of the administrator processor initiating the resource request.

10. The network as claimed in claim 9 in which each said administrator processor has a network address table, with each said network address table having the addresses of the administrator processor and the intelligent resources coupled to its primary connection node, and also having the addresses of the administrator processor and the intelligent resources coupled to its secondary node.

11. The network as claimed in claim 10 in which each said network address table also has means for indicating whether or not the particular intelligent resources coupled to the primary and secondary connection nodes of the associated administrator processor are normally assigned to it and in which each said network address table also has means for indicating whether or not the administrator processor associated with the network address table is in fact using the intelligent resources on said network address table.

12. The network as claimed in claim 11 in which each said intelligent resource has a network address table for indicating the addresses of the administrator processors to which the intelligent resource is coupled via its associated LAN and also for indicating that particular administrator processor to which it is assigned.

13. The network as claimed in claim 12 in which each said plurality of intelligent resources $C1-C_n$ comprises at least one each of a data entry terminal, an encoder, a sorter, a proofing machine, and a printer, respectively, which are associated with a financial processing system.

14. A data communication network comprising:
a plurality of local area networks, with each local area network or LAN having a plurality of intelligent resources thereon, and with each said plurality of intelligent resources comprising at least one each of intelligent resources $C1-C_n$, with $C1-C_n$ representing different intelligent resources;

a plurality of administrator processors, with each administrator processor having a primary connection node and a secondary connection node;

a first of said LANs with its associated plurality of intelligent resources thereon being coupled to the primary connection node of a first of said plurality of administrator processors and also being coupled to the secondary connection node of an adjacent administrator processor, with the remaining LANs and administrator processors being similarly coupled to form a closed ring network, and with the plurality of intelligent resources on a particular LAN being assigned for normal use to that particular administrator processor whose primary connection node is coupled to that particular LAN; and allocating means for allocating said intelligent resources, when available, among said administrator processors in response to a resource request initiated by one of said administrator processors;

a said administrator processor initiating a resource request being referred to as a requesting administrator processor;

a said administrator processor which is coupled to the secondary connection node of the requesting administrator processor being referred to as a first supplying administrator processor; and a said administrator processor which is coupled to the secondary connection node of the first supplying administrator processor being referred to as a second supplying administrator processor;

said allocating means being effective to reassign a requested one of said $C1-C_n$ intelligent resources assigned to said second supplying administrator processor to said first supplying administrator processor, when necessary, to enable a requested one of said $C1-C_n$ intelligent resources assigned to said first supplying administrator processor to be reassigned to said requesting administrator processor via its associated secondary connection node.

15. The network as claimed in claim 14 in which said allocating means comprises:
request means for sending a resource request message around said closed ring network to enable each said administrator processor to indicate whether or not it has a requested intelligent resource available for use by an administrator processor requesting the requested intelligent resource.

16. The network as claimed in claim 15 in which said allocating means also comprises:
excess means for sending an excess resource message around said closed ring network by an administrator processor having excess intelligent resources to enable the remaining administrator processors to gain access to said excess intelligent resources, if needed.

17. The network as claimed in claim 16 in which said allocating means also comprises:
means for detecting a failure in said primary connection nodes, said administrator processors, and said intelligent resources.

18. The network as claimed in claim 17 in which said allocating means includes a network address table for each said administrator processor, with each said network address table having the addresses of the administrator processor and the intelligent resources coupled to its primary connection node, and also having the addresses of the administrator processor and the intelligent resources coupled to its secondary node.

19. The network as claimed in claim 18 in which each said network address table also has means for indicating whether or not the particular intelligent resources coupled to the primary and secondary connection nodes of the associated administrator processor are normally assigned to it and in which each said network address table also has means for indicating whether or not the administrator processor associated with the network address table is in fact using the intelligent resources on said network address table.

20. In a data communication network having:
a plurality of local area networks, with each local area network or LAN having a plurality of intelligent resources coupled thereto, and with each plurality of intelligent resources comprising at least one each of intelligent resources $C_1-C_n$, with $C_1-C_n$ representing different intelligent resources; and
a plurality of administrator processors, with each said administrator processor having a primary connection node and a second connection node;
the method allocating said intelligent resources among said plurality of administrator processor comprising the steps of:
(a) coupling one end of a said LAN with the plurality of intelligent resources thereon to the primary connection node of one said administrator processor and coupling the remaining end of the LAN to the secondary connection node of an adjacent said administrator processor;
(b) repeating step a for the remaining administrator processors and LANs with the associated pluralities of intelligent resources thereon to form a closed ring network;
(c) assigning the plurality of intelligent resources on a LAN to that one of said administrator processors whose primary connection node is coupled to the LAN;
(d) sending a resource request by one of said administrator processors for at least one requested one of said $C_1-C_n$ intelligent resources around said closed ring network;
(e) determining whether or not said requested one of said $C_1-C_n$ intelligent resources is available; and
(f) assigning said requested one, when available, from the plurality of intelligent resources which is located on the LAN which is connected to the secondary connection node of the administrator processor sending said resource request.

21. The method as claimed in claim 20 in which said administrator processor sending a resource request is referred to as a requesting administrator processor, in which an administrator processor coupled to the secondary connection node of the requesting administrator processor is referred to as a first supplying administrator processor, and in which an administrator processor which is coupled to the secondary connection node of the first supplying administrator processor is referred to as a second supplying administrator processor;
said assigning step f being effected by:
(f1) reassigning a requested one of said $C_1-C_n$ intelligent resources assigned to said second supplying administrator processor to said first supplying administrator processor, when necessary, to enable a requested one of said $C_1-C_n$ intelligent resources assigned to said first supplying administrator processor to be reassigned to said requesting administrator processor via its associated secondary connection node.

22. The method as claimed in claim 21 in which said assigning step c is effected through using a network address table for each said administrator processor.

* * * * *

UNITED STATES PATENT AND TRADEMARK OFFICE
CERTIFICATE OF CORRECTION

PATENT NO. : 4,835,673

DATED : May 30, 1989

INVENTOR(S) : Robert J. Rushby et al.

It is certified that error appears in the above-identified patent and that said Letters Patent is hereby corrected as shown below:

Column 17, line 22, delete "ad" and substitute --and--.

Signed and Sealed this

Ninth Day of January, 1990

*Attest:*

JEFFREY M. SAMUELS

*Attesting Officer*     *Acting Commissioner of Patents and Trademarks*